United States Patent
Xi et al.

(10) Patent No.: US 11,456,905 B2
(45) Date of Patent: Sep. 27, 2022

(54) METHOD FOR TRANSMITTING PHASE TRACKING REFERENCE SIGNAL (PTRS), TERMINAL AND NETWORK DEVICE

(71) Applicant: VIVO MOBILE COMMUNICATION CO., LTD., Guangdong (CN)

(72) Inventors: Wei Xi, Dongguan (CN); Peng Sun, Dongguan (CN); Jingzhi Ma, Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 1 day.

(21) Appl. No.: 16/980,336

(22) PCT Filed: Mar. 7, 2019

(86) PCT No.: PCT/CN2019/077282
§ 371 (c)(1),
(2) Date: Sep. 11, 2020

(87) PCT Pub. No.: WO2019/174512
PCT Pub. Date: Sep. 19, 2019

(65) Prior Publication Data
US 2021/0044467 A1    Feb. 11, 2021

(30) Foreign Application Priority Data

Mar. 12, 2018    (CN) .......................... 201810201721.7

(51) Int. Cl.
*H04L 27/26*    (2006.01)
*H04L 27/38*    (2006.01)
(Continued)

(52) U.S. Cl.
CPC .......... *H04L 27/2613* (2013.01); *H04L 5/005* (2013.01); *H04L 27/2607* (2013.01); *H04L 27/38* (2013.01); *H04W 72/042* (2013.01)

(58) Field of Classification Search
CPC ............. H04L 27/2607; H04L 27/2613; H04L 27/2675; H04L 27/38; H04L 5/0007;
(Continued)

(56) References Cited

U.S. PATENT DOCUMENTS

2012/0300711 A1    11/2012    Wang et al.
2013/0064196 A1    3/2013    Gao et al.
(Continued)

FOREIGN PATENT DOCUMENTS

CN    102315872 A    1/2012
CN    103220073 A    7/2013
(Continued)

OTHER PUBLICATIONS

VIVO ("Remaining issues on PT-RS"; 3GPP TSG RAN WG1 Meeting #92; R1-1801526; Athens, Greece, Feb. 26-Mar. 2, 2018) (Year: 2018).*
(Continued)

*Primary Examiner* — Melvin C Marcelo
*Assistant Examiner* — Natali Pascual Peguero
(74) *Attorney, Agent, or Firm* — Maschoff Brennan

(57) ABSTRACT

A method for transmitting a PTRS, a terminal, and a network device are disclosed in this disclosure. The method includes: acquiring target DMRS ports corresponding to two PTRS ports respectively in a scenario where a terminal performs non-codebook based uplink transmission by using a CP-OFDM waveform; and transmitting corresponding PTRSs to a network device by using respective target DMRS ports.

20 Claims, 3 Drawing Sheets

Acquiring target DMRS ports corresponding to two PTRS ports respectively in a scenario where a terminal performs non-codebook based uplink transmission by using a CP-OFDM waveform — 11

Transmitting corresponding PTRSs to a network device by using the respective target DMRS ports — 12

(51) Int. Cl.
*H04L 5/00* (2006.01)
*H04W 72/04* (2009.01)

(58) Field of Classification Search
CPC ..... H04L 5/0048; H04L 5/005; H04L 5/0051; H04L 5/0053; H04W 72/042
See application file for complete search history.

(56) References Cited

U.S. PATENT DOCUMENTS

| | | |
|---|---|---|
| 2014/0269454 A1 | 9/2014 | Papasakellariou |
| 2015/0341958 A1 | 11/2015 | Guo et al. |
| 2017/0288928 A1 | 10/2017 | Xu et al. |
| 2017/0311296 A1 | 10/2017 | Onggosanusi et al. |
| 2019/0081844 A1 | 3/2019 | Lee et al. |
| 2019/0140798 A1 | 5/2019 | Li et al. |

FOREIGN PATENT DOCUMENTS

| | | |
|---|---|---|
| CN | 104054378 A | 9/2014 |
| CN | 101800622 B | 10/2015 |
| CN | 105264973 A | 1/2016 |
| CN | 107079466 A | 8/2017 |
| CN | 107579808 A | 1/2018 |
| WO | 2017/188591 A1 | 11/2017 |

OTHER PUBLICATIONS

European Search Report dated Mar. 24, 2021 as received in U.S. Appl. No. 19/767,457.

VIVO: "Remaining issues on PT-RS", 3GPP Draft R1-1801526, 3rd Generation partnership project (3GPP), Mobile Competence Centre; 650, Route Des Lucioles; F-06921 Sophia-Antipolis Cedex, France, Feb. 15, 2018.

Spreading Communications: "Remaining issues on PT-RS", 3GPP Draft R1-1801834, 3rd Generation partnership project (3GPP), Mobile Competence Centre; 650, Route Des Lucioles; F-06921 Sophia-Antipolis Cedex, France, Feb. 15, 2018.

"3rd Generation Partnership Project; Technical Specification Group Radio Access Network; NR; Multiplexing and Channel Coding" 3GPP Draft; R1-1803544, 3rd Generation partnership project (3GPP), Mobile Competence Centre 350, Route Des Lucioles; F-06921 Sophia-Antipolis Cedex, France, Mar. 9, 2018.

CN Office Action in Application No. 201810201721.7 dated Apr. 10, 2020.

CN Office Action in Application No. 201810201721.7 dated Nov. 23, 2020.

"Remaining Issues on PTRS for Nr" 3GPP TSG RAN WG1 NR Ad-Hoc#2, Jun. 27, 2017.

"Discussion on PT-RS" 3GPP TSG RAN WG1 Meeting#90, Aug. 21, 2017.

"Remaining issues on PT-RS" 3GPP TSG RAN WG1 Meeting #92, Feb. 26, 2018.

"WF on PT-RS port association" 3GPP TSG RAN WG1 Meeting #92, Feb. 26, 2018.

Written Opinion and International Search Report in Application No. PCT/CN2019077282 dated Sep. 24, 2020.

IN Office Action dated Sep. 8, 2021 as received in Application No. 202027042998.

* cited by examiner

ND NETWORK DEVICE

METHOD FOR TRANSMITTING PHASE TRACKING REFERENCE SIGNAL (PTRS), TERMINAL AND NETWORK DEVICE

CROSS-REFERENCE TO RELATED APPLICATION

The present application is a U.S. national phase application of a PCT Application No. PCT/CN2019/077282 filed on Mar. 7, 2019, which claims a priority to Chinese Patent Application No. 201810201721.7 filed in China on Mar. 12, 2018, disclosures of which are incorporated in their entireties by reference herein.

TECHNICAL FIELD

The present disclosure relates to the field of communications technology, in particular to a method for transmitting a phase tracking reference signal PTRS, a terminal, and a network device.

BACKGROUND

In future-oriented fifth-generation (5G) mobile communication systems, which are also referred to as new radio (NR), to achieve the objects of a downlink transmission rate of 20 Gbps and an uplink transmission rate of 10 Gbps, high-frequency transmission technology and massive antenna array technology have drawn considerable attention.

High-frequency band has more abundant spectrum resources, but has a limited transmission distance due to high attenuation. Massive antenna array can provide a relatively high beamforming gain, but usually requires a relatively large antenna aperture. However, the high-frequency band and the massive antenna array can be combined. The short wavelength characteristic of the high-frequency band reduces the aperture of the massive antenna array, so that it is easier and more feasible to densely deploy antennas. The relatively high beamforming gain produced by the massive antenna array in turn can effectively combat high-frequency transmission loss, thereby greatly increasing the transmission distance of high-frequency transmission. Therefore, the high-frequency transmission technology and the massive antenna array technology complement each other and may be combined for synergy. The combination therefore becomes a definite trend.

Generally, to improve transmission efficiency, high-order modulation, such as 16 QAM, 64 QAM or 256 QAM, is usually used. However, high-order modulation is usually susceptible to phase noise. In addition, the higher the modulation order is, the higher the sensitivity to phase noise is. Even worse, the higher the operating frequency is, the greater the phase noise is. Therefore, for high-frequency transmission, to eliminate phase noise, a transmitting end needs to transmit a reference signal known to a receiving end, that is, a phase tracking reference signal (PTRS). The receiving end may estimate phase noise according to the PTRS, and then perform corresponding phase compensation. Generally, the frequency domain density of the PTRS depends on a bandwidth, that is, a quantity of physical resource blocks (PRBs), assigned to the receiving end. For example, one PTRS subcarrier may be inserted for every two or four PRBs. The time-domain density is associated with a modulation and coding scheme (MCS) of data symbols. For example, one PTRS symbol may be inserted for every one, two or four orthogonal frequency division multiplexing (OFDM) symbols.

If a plurality of demodulation reference signal (DMRS) ports are quasi-co-located (QCL), data flows corresponding to the DMRS ports have the same phase noise. Therefore, these DMRSs may share one PTRS port. As a result, a PTRS port needs to be transmitted on one of the corresponding DMRS ports, which may be referred to as associating the PTRS with the DMRS port or mapping the PTRS to the DMRS port. To improve the precision of phase noise estimation, the transmitting end needs to map the PTRS port to one DMRS port with the optimal channel condition among the QCL DMRS ports corresponding to the PTRS port; and the receiving end needs to know a DMRS port where the PTRS is specifically transmitted, otherwise the PTRS is not available to estimate phase noise. For this purpose, the DMRS port where the PTRS is transmitted needs to be indicated explicitly or implicitly.

In downlink transmission, a set of a plurality of QCL DMRS ports is referred to as a DMRS port group. That is, DMRSs in the same DMRS port group are QCL, and DMRS ports belonging to different DMRS port groups are not QCL. Conventionally, for single codeword transmission, the PTRS is mapped to a DMRS port with the smallest port number; for dual codeword transmission, the PTRS is mapped to a DMRS port with the smallest port number in DMRS ports corresponding to a codeword with a relatively high MCS order.

In uplink transmission, NR systems use a discrete Fourier transform-spread OFDM (DFT-S-OFDM) waveform and a cyclic prefix-OFDM (CP-OFDM) waveform. The DFT-S-OFDM is only limited to single-stream transmission. Therefore, when a PTRS needs to be transmitted, it is only necessary to map a PTRS port to a unique DMRS port. For the CP-OFDM, although uplink transmission is similar to downlink transmission, the concept of DMRS port group has not been defined. Instead, there are three types of uplink transmission, namely, fully-coherent transmission, semi-coherent transmission, and non-coherent transmission. For the fully-coherent transmission, only one uplink PTRS port is required. That is, if a terminal reports to a network device that the terminal can support fully-coherent transmission, the network device only configures one PTRS port for the terminal. For semi-coherent transmission and non-coherent transmission, a plurality of uplink PTRS ports are required.

For a non-codebook based transmission scheme, a PTRS port mapping is indicated by a sounding reference signal resource indicator (SRI). Each configured sounding reference signal (SRS) resource is configured with a PTRS port number by using radio resource control (RRC) signaling. A quantity of PTRS port numbers is configured by using RRC signaling. Specifically, when a configured quantity of PTRS ports is 1, an indication method used by a codebook-based transmission scheme is reused. However, when the configured quantity of PTRS ports is 2, if a PTRS is mapped to a fixed DMRS port, it is difficult to ensure that the channel quality of the DMRS port satisfies requirements, the phase noise estimation precision is poor, and the reliability of uplink transmission is low.

SUMMARY

The present disclosure provides in embodiments a method for transmitting a PTRS, a terminal, and a network device.

In a first aspect, the present disclosure provides in embodiments a method for transmitting a PTRS, including:
acquiring, by a terminal, target DMRS ports corresponding to two PTRS ports respectively in a scenario where the terminal performs non-codebook based uplink transmission by using a CP-OFDM waveform; and transmitting, by the terminal, corresponding PTRSs to a network device by using the respective target DMRS ports.

In a second aspect, the present disclosure further provides in embodiments a terminal, including:

a first acquisition module, configured to acquire target DMRS ports corresponding to two PTRS ports respectively in a scenario where the terminal performs non-codebook based uplink transmission by using a CP-OFDM waveform; and a first transmission module, configured to transmit corresponding PTRSs to a network device by using the respective target DMRS ports.

In a third aspect, the present disclosure provides in embodiments a terminal, including: a processor, a memory, and a computer program stored in the memory and configured to be executed by the processor, where the processor is configured to execute the computer program to implement the steps of the foregoing method for transmitting a PTRS.

In a fourth aspect, the present disclosure provides in embodiments a method for transmitting a PTRS, including:

determining, by a network device, target DMRS ports corresponding to two PTRS ports respectively in a scenario where non-codebook based uplink transmission is performed by a terminal through a CP-OFDM waveform; and receiving, by the network device by using the respective target DMRS ports, PTRSs transmitted by the terminal.

In a fifth aspect, the present disclosure provides in embodiments a network device, including:

a determination module, configured to determine target DMRS ports corresponding to two PTRS ports respectively in a scenario where non-codebook based uplink transmission is performed by a terminal through a CP-OFDM waveform; and a reception module, configured to receive, by using the respective target DMRS ports, PTRSs transmitted by the terminal.

In a sixth aspect, the present disclosure further provides in embodiments a network device, including: a processor, a memory, and a computer program stored in the memory and configured to be executed by the processor, where the processor is configured to execute the computer program to implement the steps of the foregoing method for transmitting a PTRS.

In a seventh aspect, the present disclosure further provides in embodiments a computer-readable storage medium storing therein a computer program, where the computer program is configured to be executed by a processor to implement the steps of the foregoing method for transmitting a PTRS.

In this way, in the embodiments of the present disclosure, a terminal determines target DMRS ports corresponding to two PTRS ports respectively in a scenario where the terminal performs non-codebook based transmission by using a CP-OFDM waveform, so as to transmit PTRSs to a network device by using the target DMRS ports, thus a PTRS port can be mapped to a DMRS port with the optimal channel quality, and the phase noise estimation precision can be improved, thereby ensuring the reliability of uplink transmission.

BRIEF DESCRIPTION OF THE DRAWINGS

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative effort.

DETAILED DESCRIPTION

The exemplary embodiments of the present disclosure will be more specifically described below with reference to the accompanying drawings. The exemplary embodiments of the present disclosure are shown in the accompanying drawings. However, it should be understood that the present disclosure may be implemented in various forms, and should not be construed as being limited to the embodiments set forth herein. Rather, these embodiments are provided so that the present disclosure will be understood more thoroughly, and can fully convey the scope of the present disclosure to a person skilled in the art.

The terms such as "first" and "second" in the specification and claims of the present application are only used to distinguish between similar objects, but are not used to describe a specific sequence or order of precedence. It should be understood that the data used in this way are interchangeable in appropriate circumstances, so that the embodiments of the present application described herein, for example, can be implemented in other sequences than those illustrated or described. In addition, the term "include" and any variation thereof are intended to cover a non-exclusive inclusion. For example, a process, method, system, product or device that includes a series of steps or units not only includes those steps or units specified expressly, but may also include other steps or units that are not specified expressly or are inherent to the process, method, system, product or device.

Figure 1:
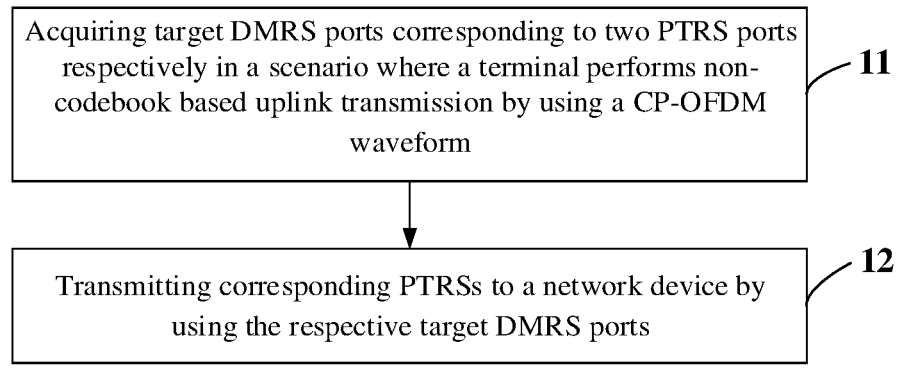
FIG. 1 is a schematic flowchart of a method for transmitting a PTRS applied to a terminal side according to an embodiment of the present disclosure.

The present disclosure provides in embodiments a method for transmitting a PTRS that is applied to a terminal side. As shown in FIG. 1, the method includes the following steps.

A step 11 includes: acquiring target DMRS ports corresponding to two PTRS ports respectively in a scenario where a terminal performs non-codebook based uplink transmission by using a CP-OFDM waveform.

When the terminal performs non-codebook based uplink transmission by using CP-OFDM, although uplink transmission is similar to downlink transmission, the concept of an uplink DMRS port group has not been defined. In addition, uplink transmission includes three types, namely, fully-coherent transmission, semi-coherent transmission, and non-coherent transmission. For the fully-coherent transmission, only one uplink PTRS port is required. For the semi-coherent transmission and the non-coherent transmission, a plurality of uplink PTRS ports are required. When the configured quantity of PTRS ports is 2, before transmitting a corresponding PTRS, the terminal needs to determine a target DMRS port to which each PTRS port is mapped. If at least one PTRS port of two PTRS ports corresponds to two or more DMRS ports, the corresponding PTRS port is preferentially mapped to a DMRS port with the optimal channel quality. In the embodiments of the present disclosure, an example in which the configured quantity of PTRS ports is 2 is described. A person skilled in the art may understand that when the configured quantity of PTRS ports is greater than 2, before transmitting a corresponding PTRS, the terminal needs to determine a target DMRS port to which each PTRS port is mapped. In other words, the embodiments of the present disclosure are applicable to a case in which the configured quantity of PTRS ports is greater than or equal to 2.

A step 12 includes: transmitting corresponding PTRS s to a network device by using the respective target DMRS ports.

After the DMRS ports corresponding to the two PTRS ports respectively are determined, corresponding PTRSs are transmitted to the network device by using the respective target DMRS ports. Because a corresponding PTRS port is preferentially mapped to a DMRS port with the optimal channel quality, the phase noise estimation precision can be improved, thereby ensuring the reliability of uplink transmission.

In non-codebook based transmission by using a CP-OFDM waveform, the network device configures one PTRS port number for each SRS resource. When a quantity of PTRS ports is 2 (denoted as a PTRS port A and a PTRS port B), PTRS ports are mapped to DMRS ports in the following scenarios.

Scenario 1:

In this scenario, if each PTRS port corresponds to one DMRS port, it is determined that DMRS ports corresponding to the two PTRS ports respectively are the respective target DMRS ports. That is, each of the two PTRSs only corresponds to one SRS resource (or SRI). That is, when there are only two DMRS ports, each PTRS port is mapped to a unique DMRS port that corresponds to the PTRS port. For example, the network device configures a PTRS port A for one SRS resource, and a DMRS port corresponding to the SRS resource is a DMRS port with the smallest DMRS port attribute value. The network device configures a PTRS port B for another SRS resource, and a DMRS port corresponding to the SRS resource is a DMRS port with the largest DMRS port attribute value. In this case, the PTRS port A corresponds to a DMRS port with the smallest DMRS port attribute value, and the PTRS port B corresponds to a DMRS port with the largest DMRS port attribute value. Or on the contrary, the network device configures a PTRS port A for one SRS resource, and a DMRS port corresponding to the SRS resource is a DMRS port with the largest DMRS port attribute value. The network device configures a PTRS port B for another SRS resource, and a DMRS port corresponding to the SRS resource is a DMRS port with the smallest DMRS port attribute value. In this case, the PTRS port A corresponds to a DMRS port with the largest DMRS port attribute value, and the PTRS port B corresponds to a DMRS port with the smallest DMRS port attribute value.

In this scenario, the network device does not need to introduce into DCI an indication field used for indicating a mapping between PTRS ports and DMRS ports. Alternatively, if an indication field used for indicating a mapping between PTRS ports and DMRS ports is introduced into DCI, in this scenario, regardless of the value of the indication field in the DCI, the terminal determines the mapping between PTRS ports and DMRS ports according to the PTRS ports configured by the network device for the SRS resources and the DMRS ports.

Scenario 2:

If a plurality of SRS resources correspond to the same PTRS port number, DMRS ports corresponding to these SRS resources share one PTRS port. In two PTRS ports, one PTRS port (for example, the PTRS port A) only corresponds to one SRS resource (that is, one DMRS port), and the other PTRS port (for example, the PTRS port B) corresponds to two or three SRS resources (that is, a plurality of DMRS ports, denoted as a set $D_B$, the size of $D_B$ is $|D_B| \geq 2$, and in particular, $|D_B|=2$ or 3). A manner of indicating the mapping between PTRS ports and DMRS ports includes, but is not limited to, following manners.

Manner 1: The step of determining the target DMRS ports corresponding to the two PTRS ports respectively according to the indication field in the DCI includes: determining, if the two PTRS ports include a first PTRS port corresponding to at least two DMRS ports, a target DMRS port corresponding to the first PTRS port according to the indication field in the DCI. That is, the network device only indicates in the DCI a mapping between the PTRS port B and the DMRS port set $D_B$ (the indicated content or object may be a DMRS port index or a corresponding SRI index of DMRS port in $D_B$), but does not indicate a mapping between the PTRS port A and a DMRS port corresponding to the PTRS port A. The mapping between the PTRS port A and a DMRS port corresponding to the PTRS port A may be determined according to the PTRS port number configured by the network device for an SRS resource and the DMRS port. The mapping between the PTRS port B and DMRS ports corresponding to the PTRS port B may be indicated according to the following examples. However, the present disclosure is not limited thereto.

EXAMPLE 1

The step of determining the target DMRS port corresponding to the first PTRS port according to the indication field in the DCI includes: determining, according to a bit status of an indication bit of a DCI indication field, a DMRS port with the smallest, the second smallest or the largest DMRS port attribute value as the target DMRS port corresponding to the first PTRS port. A quantity of indication bits of the DCI indication field is determined according to the maximum quantity of DMRS ports corresponding to a PTRS port. For example, the PTRS port corresponds to N DMRS ports, then a quantity of indication bits is M, where $2^{M-1} < N \leq 2^M$. When the value of the indication bit of the indication field in the DCI is $2m-1$, a DMRS port with the $2m^{th}$ largest or smallest DMRS port attribute value in the N DMRS ports is determined as the target DMRS port corresponding to the first PTRS port, wherein $1 < m \leq M$.

For example, the PTRS port A is mapped to a unique DMRS port corresponding to the PTRS port A. The network device only indicates in the indication field in the DCI that the PTRS port B is mapped to the DMRS port set $D_B$. That is, a mapping between the PTRS port B and the DMRS port set DB is explicitly indicated by the indication field (for example, a PTRS-DMRS association) in the DCI. When $|D_B|=2$, the indication field includes one indication bit. When the indication bit is a first value, it is determined that a DMRS port with a relatively small DMRS port attribute value is the target DMRS port corresponding to the first PTRS port (the PTRS port B). When the indication bit is a second value, it is determined that a DMRS port with a relatively large DMRS port attribute value is the target DMRS port corresponding to the first PTRS port. When $|D_B|=3$, the indication field includes two indication bits. When the two indication bits denote a third value, it is determined that a DMRS port with the smallest DMRS port attribute value is the target DMRS port corresponding to the first PTRS port. When the two indication bits denote a fourth value, it is determined that a DMRS port with the second smallest DMRS port attribute value is the target DMRS port corresponding to the first PTRS port. When the two indication bits denote a fifth value, it is determined that a DMRS port with the largest DMRS port attribute value is the target DMRS port corresponding to the first PTRS port. The DMRS port attribute value includes a DMRS port number or an SRI number corresponding to a DMRS port. The DMRS port number is used as an example, as shown in Table 1.

TABLE 1

| Quantity of DMRS ports corresponding to the PTRS port B | Indication field | DMRS port number to which the PTRS port B is mapped |
| --- | --- | --- |
| 2 | 0 | The first DMRS port in $D_B$ (a DMRS port with a relatively small DMRS port number in $D_B$) |
|  | 1 | The second DMRS port in $D_B$ (a DMRS port with a relatively large DMRS port number in $D_B$) |
| 3 | 00 | The first DMRS port in $D_B$ (a DMRS port with the smallest DMRS port number in $D_B$) |
|  | 01 | The second DMRS port in $D_B$ (a DMRS port with the second smallest DMRS port number in $D_B$) |
|  | 10 | The third DMRS port in $D_B$ (a DMRS port with the largest DMRS port number in $D_B$) |
|  | 11 | Reserved |

When the PTRS port B corresponds to two DMRS ports, if the terminal detects that the bit value of the indication field in the DCI is "0", it is determined that a DMRS port with a relatively small DMRS port number in $D_B$ is a target DMRS port for the PTRS port B, and if the terminal detects that the bit value of the indication field in the DCI is "1", it is determined that a DMRS port with a relatively large DMRS port number in $D_B$ is a target DMRS port for the PTRS port B. When the PTRS port B corresponds to three DMRS ports, if the terminal detects that the bit value of the indication field in the DCI is "00", it is determined that a DMRS port with the smallest DMRS port number in $D_B$ is a target DMRS port for the PTRS port B, if the terminal detects that the bit value of the indication field in the DCI is "01", it is determined that a DMRS port with the second smallest DMRS port number in $D_B$ is a target DMRS port for the PTRS port B, and if the terminal detects that the bit value of the indication field in the DCI is "10", it is determined that a DMRS port with the largest DMRS port number in $D_B$ is a target DMRS port for the PTRS port B. The bit value "11" of the indication field in the DCI is reserved and may be used for indicating other information.

Alternatively, an SRI number corresponding to a DMRS port is used as an example, as shown in Table 2.

TABLE 2

| Quantity of DMRS ports corresponding to the PTRS port B | Indication field | DMRS port number to which the PTRS port B is mapped |
| --- | --- | --- |
| 2 | 0 | A DMRS port corresponding to the first SRI (an SRI with a relatively small SRI number in $D_B$) in $D_B$ |
|  | 1 | A DMRS port corresponding to the second SRI (an SRI with a relatively large SRI number in $D_B$) in $D_B$ |
| 3 | 00 | A DMRS port corresponding to the first SRI (an SRI with the smallest SRI number in $D_B$) in $D_B$ |
|  | 01 | A DMRS port corresponding to the second SRI (an SRI with the second smallest SRI number in $D_B$) in $D_B$ |
|  | 10 | A DMRS port corresponding to the third SRI (an SRI with the largest SRI number in $D_B$) in $D_B$ |
|  | 11 | Reserved |

When the PTRS port B corresponds to two DMRS ports, if the terminal detects that the bit value of the indication field in the DCI is "0", it is determined that a DMRS port corresponding to an SRI with a relatively small SRI number in $D_B$ is a target DMRS port for the PTRS port B, and if the terminal detects that the bit value of the indication field in the DCI is "1", it is determined that a DMRS port corresponding to an SRI with a relatively large SRI number in $D_B$ is a target DMRS port for the PTRS port B. When the PTRS port B corresponds to three DMRS ports, if the terminal detects that the bit value of the indication field in the DCI is "00", it is determined that a DMRS port corresponding to an SRI with the smallest SRI number in $D_B$ is a target DMRS port for the PTRS port B, if the terminal detects that the bit value of the indication field in the DCI is "01", it is determined that a DMRS port corresponding to an SRI with the second smallest SRI number in $D_B$ is a target DMRS port for the PTRS port B, and if the terminal detects that the bit value of the indication field in the DCI is "10", it is determined that a DMRS port corresponding to an SRI with the largest SRI number in $D_B$ is a target DMRS port for the PTRS port B. The bit value "11" of the indication field in the DCI is reserved and may be used for indicating other information.

EXAMPLE 2

When the indication field includes one indication bit, the step of determining the target DMRS port corresponding to the first PTRS port according to the indication field in the DCI includes: determining, according to a bit status of an indication bit of a DCI indication field, a DMRS port with the smallest, the second smallest or the largest DMRS port attribute value as the target DMRS port corresponding to the first PTRS port. The bit status includes a bit value of 0, 1 or null. Optionally, the example may include one of the following steps: if there is one first PTRS port, determining, when the indication bit is a first value (for example, 0 or 1), that a DMRS port with the smallest DMRS port attribute value is the target DMRS port corresponding to the first PTRS port; determining, when the indication bit is a second value (for example, 1 or 0), that a DMRS port with the second smallest DMRS port attribute value is the target DMRS port corresponding to the first PTRS port; and determining, when the indication bit is null (the indication bit is absent), that a DMRS port with the largest DMRS port attribute value is the target DMRS port corresponding to the first PTRS port. For example, the PTRS port A is mapped to a unique DMRS port corresponding to the PTRS port A; and the network device only indicates in the indication field in the DCI that the PTRS port B is mapped to the DMRS port set $D_B$, that is, a mapping between the PTRS port B and the DMRS port set $D_B$ is explicitly indicated by the indication field (for example, a PTRS-DMRS association) in the DCI. When $|D_B|=2$ or 3, the indication field includes only one indication bit. The DMRS port attribute value includes a DMRS port number or an SRI number corresponding to a DMRS port. The DMRS port number is used as an example, as shown in Table 3.

TABLE 3

| Indication field | DMRS port number to which the PTRS port B is mapped |
|---|---|
| 0 | The first DMRS port in $D_B$ (a DMRS port with the smallest DMRS port number in $D_B$) |
| 1 | The second DMRS port in $D_B$ |
| — (null or absent) | The third DMRS port in $D_B$ (when and only when $|D_B|$ = 3) |

When the PTRS port B corresponds to two or three DMRS ports, if the terminal detects that the bit value of the indication field in the DCI is "0", it is determined that a DMRS port with the smallest DMRS port number in $D_B$ is a target DMRS port for the PTRS port B, and if the terminal detects that the bit value of the indication field in the DCI is "1", it is determined that a DMRS port with the second smallest DMRS port number in $D_B$ is a target DMRS port for the PTRS port B. When the PTRS port B corresponds to three DMRS ports, if the terminal detects that the bit value of the indication field in the DCI is "null", it is determined that a DMRS port with the largest DMRS port number in $D_B$ is a target DMRS port for the PTRS port B.

Alternatively, an SRI number corresponding to a DMRS port is used as an example, as shown in Table 4.

TABLE 4

| Indication field | DMRS port number to which the PTRS port B is mapped |
|---|---|
| 0 | A DMRS port corresponding to the first SRI (an SRI with the smallest SRI number in $|D_B|$) in $|D_B|$ |
| 1 | a DMRS port corresponding to the second SRI in $|D_B|$ |
| — (null or absent) | a DMRS port corresponding to the third SRI in $|D_B|$ (when and only when $|D_B|$ = 3) |

When the PTRS port B corresponds to two or three DMRS ports, if the terminal detects that the bit value of the indication field in the DCI is "0", it is determined that a DMRS port corresponding to an SRI with the smallest SRI number in $D_B$ is a target DMRS port for the PTRS port B, and if the terminal detects that the bit value of the indication field in the DCI is "1", it is determined that a DMRS port corresponding to an SRI with the second smallest SRI number in $D_B$ is a target DMRS port for the PTRS port B. When the PTRS port B corresponds to three DMRS ports, if the terminal detects that the bit value of the indication field in the DCI is "null", it is determined that a DMRS port corresponding to an SRI with the largest SRI number in $D_B$ is a target DMRS port for the PTRS port B.

It should be noted that in Example 2, the determinations according to different bit statuses that the DMRS port with the smallest, the second smallest, or the largest DMRS port attribute value is the target DMRS port are interchangeable. For example, when the indication bit is null (the indication bit is absent), it is determined that a DMRS port with the smallest or the second smallest DMRS port attribute value is the target DMRS port corresponding to the first PTRS port. When the indication bit is the first value or second value, it is determined that a DMRS port with the largest DMRS port attribute value is the target DMRS port corresponding to the first PTRS port.

Manner 2: The network device indicates in the DCI both the mapping between the PTRS port A and the DMRS port set DA and the mapping between the PTRS port B and the DMRS port set $D_B$. The indicated content or object may be a DMRS port index value or a corresponding SRI index of DMRS port in DA and $D_B$.

Optionally, the indication field includes two indication bits, and a first target DMRS port corresponding to one of the two PTRS ports (the PTRS port A or the PTRS port B) is determined according to a most significant bit in the two indication bits. According to a least significant bit in the two indication bits, a second target DMRS port corresponding to the other one of the two PTRS ports (the PTRS port B or the PTRS port A) is determined. The PTRS ports corresponding to the most significant bit and the least significant bit are interchangeable. In a preferred embodiment, it is determined according to a bit status of the most significant bit in the two indication bits that a DMRS port with the smallest or the largest DMRS port attribute value is the first target DMRS port corresponding to one of the two PTRS ports. It is determined according to a bit status of the least significant bit in the two indication bits that a DMRS port with the smallest or the largest DMRS port attribute value is the second target DMRS port corresponding to the other one of the two PTRS ports. The bit status includes the bit value of 0 or 1. For example, $|D_A|=1$, and $|D_B|=2$ or 3. A mapping between PTRS ports and DMRS ports may be indicated in the following manner, but is not limited thereto.

The network device introduces an indication field (for example, a PTRS-DMRS association) into the DCI to explicitly indicate a mapping between PTRS ports and DMRS ports. The indication field includes two indication bits. A most significant bit (MSB) indicates a mapping between a PTRS port with a relatively small port number (for example, the PTRS port A) of the two PTRS ports and a DMRS port set corresponding to the PTRS port. A least significant bit (LSB) indicates a mapping between a PTRS port with a relatively large port number (for example, the PTRS port B) of the two PTRS ports and a DMRS port set corresponding to the PTRS port. Or on the contrary, an MSB indicates a mapping between a PTRS port with a relatively large port number (for example, the PTRS port B) of the two PTRS ports and a DMRS port set corresponding to the PTRS port. An LSB indicates a mapping between a PTRS port with a relatively small port number (for example, the PTRS port A) of the two PTRS ports and a DMRS port set corresponding to the PTRS port. The DMRS port attribute value includes a DMRS port number or an SRI number corresponding to a DMRS port. The DMRS port number is used as an example, as shown in Table 5.

TABLE 5

| MSB of the indication field | DMRS port number to which the PTRS port B is mapped | LSB of the indication field | DMRS port number to which the PTRS port A is mapped |
|---|---|---|---|
| 0 | The first DMRS port in $D_B$ (a DMRS port with the smallest DMRS port number in $D_B$) | 0, 1 | A unique DMRS port in $D_A$ |
| 1 | The second DMRS port in $D_B$ | | A unique DMRS port in $D_A$ |

When the PTRS port A corresponds to one DMRS port and the PTRS port B corresponds to two DMRS ports, if the terminal detects that the most significant bit value of the indication field in the DCI is "0", it is determined that a DMRS port with the smallest DMRS port number in $D_B$ is a target DMRS port for the PTRS port B, and if the terminal detects that the most significant bit value of the indication field in the DCI is "1", it is determined that a DMRS port with the largest DMRS port number in $D_B$ is a target DMRS port for the PTRS port B. When the terminal detects that the least significant bit value of the indication field in the DCI is "0" or "1", it is determined that a unique DMRS port in DA is a target DMRS port for the PTRS port A.

Alternatively, an SRI number corresponding to a DMRS port is used as an example, as shown in Table 6.

TABLE 6

| MSB of the indication field | DMRS port number to which the PTRS port B is mapped | LSB of the indication field | DMRS port number to which the PTRS port A is mapped |
|---|---|---|---|
| 0 | A DMRS port corresponding to the first SRI (an SRI with the smallest SRI number in $D_B$) in $D_B$ | 0, 1 | A unique DMRS port in $D_A$ |
| 1 | a DMRS port corresponding to the second SRI in $D_B$ | | A unique DMRS port in $D_A$ |

When the PTRS port A corresponds to one DMRS port and the PTRS port B corresponds to two DMRS ports, if the terminal detects that the most significant bit value of the indication field in the DCI is "0", it is determined that a DMRS port corresponding to an SRI with the smallest SRI number in $D_B$ is a target DMRS port for the PTRS port B, and if the terminal detects that the most significant bit value of the indication field in the DCI is "1", it is determined that a DMRS port corresponding to an SRI with the largest SRI number in $D_B$ is a target DMRS port for the PTRS port B. When the terminal detects that the least significant bit value of the indication field in the DCI is "0" or "1", it is determined that a unique DMRS port in DA is a target DMRS port for the PTRS port A.

Scenario 3:

If a plurality of SRS resources correspond to the same PTRS port number, DMRS ports corresponding to these SRS resources share the PTRS port. In two PTRS ports, each PTRS port (the PTRS port A and the PTRS port B) corresponds to a plurality of (≥2) SRS resources (that is, a plurality of DMRS ports). For example, the PTRS port A corresponds to the DMRS port set DA, and the PTRS port B corresponds to the DMRS port set $D_B$. $|D_A|$=2, and $|D_B|$=2. A manner of indicating the mapping between PTRS ports and DMRS ports includes, but is not limited to: the network device introduces an indication field (for example, a PTRS-DMRS association) into the DCI to explicitly indicate the mapping between PTRS ports and DMRS ports.

Optionally, the indication field includes two indication bits, a first target DMRS port corresponding to one of the two PTRS ports (the PTRS port A or the PTRS port B) is determined according to a most significant bit in the two indication bits. A second target DMRS port corresponding to the other one of the two PTRS ports (the PTRS port B or the PTRS port A) is determined according to a least significant bit in the two indication bits. The PTRS ports corresponding to the most significant bit and the least significant bit are interchangeable. In a preferred embodiment, it is determined according to a bit status of the most significant bit in the two indication bits that a DMRS port with the smallest or the largest DMRS port attribute value is the first target DMRS port corresponding to one of the two PTRS ports. It is determined according to a bit status of the least significant bit in the two indication bits that a DMRS port with the smallest or the largest DMRS port attribute value is the second target DMRS port corresponding to the other one of the two PTRS ports. The bit status includes the bit value of 0 or 1.

Optionally, when the most significant bit is a sixth value, it is determined that a DMRS port with the smallest DMRS port attribute value is the first target DMRS port corresponding to one of the two PTRS ports. When the most significant bit in the two indication bits is a seventh value, it is determined that a DMRS port with the largest DMRS port attribute value is the first target DMRS port corresponding to one of the two PTRS ports. When the least significant bit in the two indication bits is an eighth value, it is determined that a DMRS port with the smallest DMRS port attribute value is the second target DMRS port corresponding to the other one of the two PTRS ports. When the least significant bit in the two indication bits is a ninth value, it is determined that a DMRS port with the largest DMRS port attribute value is the second target DMRS port corresponding to the other one of the two PTRS ports. For example, the indication field includes two indication bits. An MSB indicates a mapping between a PTRS port with a relatively small port number (for example, the PTRS port A) of the two PTRS ports and the DMRS port set DA corresponding to the PTRS port. An LSB indicates a mapping between a PTRS port with a relatively large port number (for example, the PTRS port B) of the two PTRS ports and the DMRS port set $D_B$ corresponding to the PTRS port. Or on the contrary, an MSB indicates a mapping between a PTRS port with a relatively large port number (for example, the PTRS port B) of the two PTRS ports and the DMRS port set $D_B$ corresponding to the PTRS port. An LSB indicates a mapping between a PTRS port with a relatively small port number (for example, the PTRS port A) of the two PTRS ports and the DMRS port set DA corresponding to the PTRS port. The DMRS port attribute value includes a DMRS port number or an SRI number corresponding to a DMRS port. The DMRS port number is used as an example, as shown in Table 7.

TABLE 7

| MSB of the indication field | DMRS port number to which the PTRS port B is mapped | LSB of the indication field | DMRS port number to which the PTRS port A is mapped |
| --- | --- | --- | --- |
| 0 | The first DMRS port in $D_B$ (a DMRS port with a relatively small DMRS port number in $D_B$) | 0 | The first DMRS port in $D_A$ (a DMRS port with a relatively small DMRS port number in $D_A$) |
| 1 | The second DMRS port in $D_B$ (a DMRS port with a relatively large DMRS port number in $D_B$) | 1 | The second DMRS port in $D_A$ (a DMRS port with a relatively large DMRS port number in $D_A$) |

When the PTRS port A corresponds to two DMRS ports and the PTRS port B corresponds to two DMRS ports, if the terminal detects that the most significant bit value of the indication field in the DCI is "0", it is determined that a DMRS port with the smallest DMRS port number in $D_B$ is a target DMRS port for the PTRS port B, and if the terminal detects that the most significant bit value of the indication field in the DCI is "1", it is determined that a DMRS port with the largest DMRS port number in $D_B$ is a target DMRS port for the PTRS port B. If the terminal detects that the least significant bit value of the indication field in the DCI is "0", it is determined that a DMRS port with the smallest DMRS port number in DA is a target DMRS port for the PTRS port A, and if the terminal detects that the least significant bit value of the indication field in the DCI is "1", it is determined that a DMRS port with the largest DMRS port number in DA is a target DMRS port for the PTRS port A.

Alternatively, an SRI number corresponding to a DMRS port is used as an example, as shown in Table 8.

When the PTRS port A corresponds to two DMRS ports and the PTRS port B corresponds to two DMRS ports, if the terminal detects that the most significant bit value of the indication field in the DCI is "0", it is determined that a DMRS port corresponding to an SRI with the smallest SRI number in $D_B$ is a target DMRS port for the PTRS port B, and if the terminal detects that the most significant bit value of the indication field in the DCI is "1", it is determined that a DMRS port corresponding to an SRI with the largest SRI number in $D_B$ is a target DMRS port for the PTRS port B. If the terminal detects that the least significant bit value of the indication field in the DCI is "0", it is determined that a DMRS port corresponding to an SRI with the smallest SRI number in $D_A$ is a target DMRS port for the PTRS port A, and if the terminal detects that the least significant bit value of the indication field in the DCI is "1", it is determined that a DMRS port corresponding to an SRI with the largest SRI number in $D_A$ is a target DMRS port for the PTRS port A.

In the method for transmitting a PTRS in the embodiments of the present disclosure, a terminal determines target DMRS ports corresponding to two PTRS ports respectively in a scenario where the terminal performs non-codebook based transmission by using a CP-OFDM waveform, so as to transmit PTRSs to a network device by using the target DMRS ports, so that a PTRS port can be mapped to a DMRS port with the optimal channel quality, and the phase noise estimation precision can be improved, thereby ensuring the reliability of uplink transmission.

The method for transmitting a PTRS in different scenarios are described in the foregoing embodiments. A terminal corresponding to the method is further described below with reference to the accompanying drawings.

Figure 2:
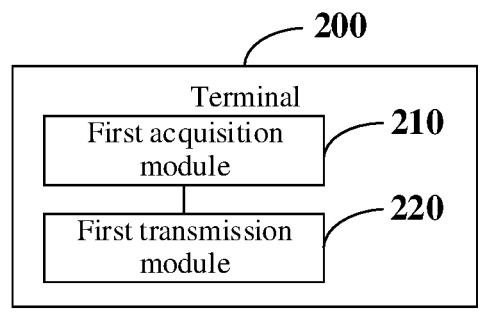
FIG. 2 is a schematic diagram of modular structure of a terminal according to an embodiment of the present disclosure.

As shown in FIG. 2, a terminal 200 according to an embodiment of the present disclosure can implement the details of the method of acquiring target DMRS ports

TABLE 8

| MSB of the indication field | DMRS port number to which the PTRS port B is mapped | LSB of the indication field | DMRS port number to which the PTRS port A is mapped |
| --- | --- | --- | --- |
| 0 | A DMRS port corresponding to the first SRI (an SRI with a relatively small SRI number in $D_B$) in $D_B$ | 0 | A DMRS port corresponding to the first SRI (an SRI with a relatively small SRI number in $D_A$) in $D_A$ |
| 1 | A DMRS port corresponding to the second SRI (an SRI with a relatively large SRI number in $D_B$) in $D_B$ | 1 | A DMRS port corresponding to the second SRI (an SRI with a relatively large SRI number in $D_A$) in $D_A$ | corresponding to two PTRS ports respectively in a scenario where the terminal performs non-codebook based uplink transmission by using a CP-OFDM waveform and transmitting corresponding PTRSs to a network device by using the respective target DMRS ports in the foregoing embodiments, and achieve the same effects. The terminal 200 specifically includes the following functional modules:

a first acquisition module 210, configured to acquire target DMRS ports corresponding to two PTRS ports respectively in a scenario where the terminal performs non-codebook based uplink transmission by using a CP-OFDM waveform; and a first transmission module 220, configured to transmit corresponding PTRSs to a network device by using the respective target DMRS ports.

The first acquisition module 210 includes:

a first determination submodule, configured to, if each PTRS port corresponds to one DMRS port, determine that DMRS ports corresponding to the two PTRS ports respectively are the respective target DMRS ports.

The first acquisition module 210 further includes:

a first reception submodule, configured to receive downlink control information (DCI) from the network device, where the DCI includes an indication field, and the indication field is used for indicating DMRS ports corresponding to at least one PTRS port; and a second determination submodule, configured to determine the target DMRS ports corresponding to the two PTRS ports respectively according to the indication field in the DCI.

The second determination submodule includes:

a first determination unit, configured to determine, if the two PTRS ports include a first PTRS port corresponding to at least two DMRS ports, a target DMRS port corresponding to the first PTRS port according to the indication field in the DCI.

When the indication field includes one indication bit, the first determination unit includes one of the following:

a first determination subunit, configured to: if there is one first PTRS port, determine, when the indication bit is a first value, that a DMRS port with the smallest DMRS port attribute value is a target DMRS port corresponding to the first PTRS port;

a second determination subunit, configured to determine, when the indication bit is a second value, that a DMRS port with the second smallest DMRS port attribute value is a target DMRS port corresponding to the first PTRS port; or a third determination subunit, configured to determine, when the indication bit is null, that a DMRS port with the largest DMRS port attribute value is a target DMRS port corresponding to the first PTRS port.

When the indication field includes two indication bits, the first determination unit includes one of the following:

a fourth determination subunit, configured to: if there is one first PTRS port, determine, when the two indication bits denote a third value, that a DMRS port with the smallest DMRS port attribute value is a target DMRS port corresponding to the first PTRS port;

a fifth determination subunit, configured to determine, when the two indication bits denote a fourth value, that a DMRS port with the second smallest DMRS port attribute value is a target DMRS port corresponding to the first PTRS port; or a sixth determination subunit, configured to determine, when the two indication bits denote a fifth value, that a DMRS port with the largest DMRS port attribute value is a target DMRS port corresponding to the first PTRS port.

When the indication field includes two indication bits, the second determination submodule further includes:

a second determination unit, configured to determine a first target DMRS port corresponding to one of the two PTRS ports according to a most significant bit in the two indication bits;

a third determination unit, configured to determine a second target DMRS port corresponding to the other one of the two PTRS ports according to a least significant bit in the two indication bits.

The second determination unit includes one of the following:

a seventh determination subunit, configured to determine, when the most significant bit is a sixth value, that a DMRS port with the smallest DMRS port attribute value is the first target DMRS port corresponding to one of the two PTRS ports;

an eighth determination subunit, configured to determine, when the most significant bit in the two indication bits is a seventh value, that a DMRS port with the largest DMRS port attribute value is the first target DMRS port corresponding to one of the two PTRS ports.

The second determination unit includes one of the following:

a ninth determination subunit, configured to determine, when the least significant bit in the two indication bits is an eighth value, that a DMRS port with the smallest DMRS port attribute value is the second target DMRS port corresponding to the other one of the two PTRS ports;

a tenth determination subunit, configured to determine, when the least significant bit in the two indication bits is a ninth value, that a DMRS port with the largest DMRS port attribute value is the second target DMRS port corresponding to the other one of the two PTRS ports.

The DMRS port attribute value includes a DMRS port number or an SRI number corresponding to a DMRS port.

It should be noted that, in the embodiments of the present disclosure, a terminal determines target DMRS ports corresponding to two PTRS ports respectively in a scenario where the terminal performs non-codebook based transmission by using a CP-OFDM waveform, so as to transmit PTRSs to a network device by using the target DMRS ports, so that a PTRS port can be mapped to a DMRS port with the optimal channel quality, and the phase noise estimation precision can be improved, thereby ensuring the reliability of uplink transmission.

Figure 3:
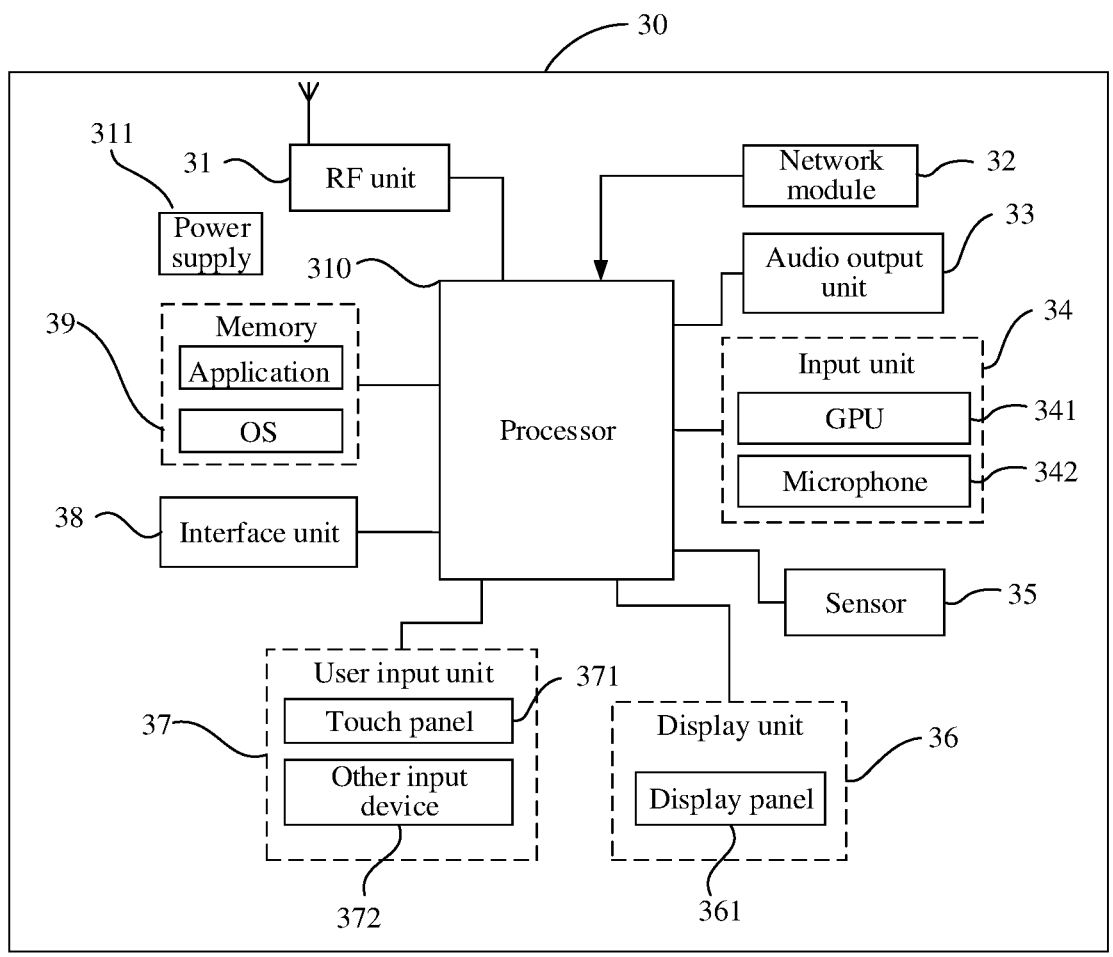
FIG. 3 is a block diagram of a terminal according to an embodiment of the present disclosure.

To further achieve the foregoing object, FIG. 3 is a schematic diagram of the hardware structure of a terminal that implements the embodiments of the present disclosure. A terminal 30 includes, but is not limited to, a radio frequency (RF) unit 31, a network module 32, an audio output unit 33, an input unit 34, a sensor 35, a display unit 36, a user input unit 37, an interface unit 38, a memory 39, a processor 310, and a power supply 311, among other components. It may be understood by a person skilled in the art that the terminal structure shown in FIG. 3 does not constitute a limitation on the terminal, and the terminal may include more or fewer components than those shown, or some components may be combined, or different component arrangements are used. In embodiments of the present disclosure, the terminal includes, but is not limited to, a mobile phone, a tablet computer, a notebook computer, a palmtop computer, an in-vehicle terminal, a wearable device, and a pedometer.

The processor 310 is configured to acquire target DMRS ports corresponding to two PTRS ports respectively in a scenario where the terminal performs non-codebook based uplink transmission by using a CP-OFDM waveform.

The RF unit 31 is configured to transmit corresponding PTRSs to a network device by using the respective target DMRS ports.

The terminal in the embodiments of the present disclosure determines target DMRS ports corresponding to two PTRS ports respectively in a scenario where the terminal performs non-codebook based transmission by using a CP-OFDM waveform, so as to transmit PTRSs to a network device by using the target DMRS ports, so that a PTRS port can be mapped to a DMRS port with the optimal channel quality, and the phase noise estimation precision can be improved, thereby ensuring the reliability of uplink transmission.

It should be understood that in embodiments of the present disclosure, the RF unit 31 may be configured to receive and transmit signals during receiving or transmitting of information or a call, and specifically, receive downlink data from a base station to be processed by the processor 310. In addition, uplink data is transmitted to the base station. Generally, the RF unit 31 includes, but is not limited to, an antenna, at least one amplifier, a transceiver, a coupler, a low noise amplifier, a duplexer, and the like. In addition, the RF unit 31 can also communicate with a network and other devices through a wireless communication system.

The terminal provides a user with wireless broadband internet access through the network module 32, for example, helps the user to receive and send emails, browse web pages, and access streamed media.

The audio output unit 33 may convert audio data received by the RF unit 31 or the network module 32 or stored in the memory 39 into an audio signal and output the audio signal as sound. Moreover, the audio output unit 33 can also provide audio output (for example, incoming call ringtone, message received ringtone) associated with a specific function performed by the terminal 30. The audio output unit 33 includes a speaker, a buzzer, a receiver, and the like.

The input unit 34 is configured to receive an audio signal or a video signal. The input unit 34 may include a graphics processing unit (GPU) 341 and a microphone 342, and the GPU 341 processes image data of a still picture or a video obtained by an image capturing device (such as a camera) in a video capturing mode or an image capturing mode. Processed image frames can be displayed on the display unit 36. The image frames processed by the GPU 341 may be stored in the memory 39 (or another storage medium) or transmitted via the RF unit 31 or the network module 32. The microphone 342 can receive sound and can process such sound into audio data. In the case of a telephone call mode, the processed audio data can be converted into a format that can be transmitted to a mobile communication base station via the RF unit 31 and outputted.

The terminal 30 further includes at least one sensor 35 such as a light sensor, a motion sensor, and other sensors. Specifically, the light sensor includes an ambient light sensor and a proximity sensor. The ambient light sensor can adjust the brightness of a display panel 361 according to the brightness of the ambient light, and the proximity sensor can turn off the display panel 361 and/or backlight when the terminal 30 moves near the ear. As a kind of motion sensor, an acceleration sensor may detect a magnitude of acceleration on each direction (generally, on three axes). While remaining still, the acceleration sensor may detect the magnitude and direction of gravity, which may be used in posture identification of the mobile terminal (e.g., switch between portrait and landscape modes, related games, magnetometer posture calibration), vibration identification related function (e.g., pedometer, knock) and the like. The sensor 35 may further include a fingerprint sensor, a pressure sensor, an iris sensor, a molecular sensor, a gyroscope, a barometer, a hygrometer, a thermometer, an infrared sensor, and the like. Details thereof are not described herein.

The display unit 36 is configured to display information input by the user or information provided to the user. The display unit 36 may include a display panel 361. The display panel 361 may be configured in the form of a liquid crystal display (LCD), an organic light-emitting diode (OLED) or the like.

The user input unit 37 may be configured to receive input numeric or character information and to generate key signal inputs related to user configurations and functional control of the terminal. Specifically, the user input unit 37 includes a touch panel 371 and other input device 372. The touch panel 371, also referred to as a touch screen, can collect a touch operation (for example, an operation of the user on the touch panel 371 or near the touch panel 371 using a finger, a stylus or any appropriate object or accessory) of the user on or near the touch panel 371. The touch panel 371 may include a touch detection device and a touch controller. The touch detection device detects the position where the user touched and the signal resulting from the touch operation, and conveys the signal to the touch controller; the touch controller receives the touch information from the touch detector, converts the information into coordinates of the touch and conveys the coordinates to the processor 310. The touch controller receives commands from the processor 310 and executes the commands. In addition, the touch panel 371 may be implemented in various types such as resistive, capacitive, infrared, and surface acoustic wave. In addition to the touch panel 371, the user input unit 37 may further include the other input device 372. Specifically, the other input device 372 may include, but are not limited to, a physical keyboard, functional keys (for example, a volume control button, and a switch button), a trackball, a mouse, and a joystick. Details thereof are not described herein.

Further, the touch panel 371 may be overlaid on the display panel 361. When the touch panel 371 detects a touch operation on or near the touch panel 371, the touch panel 371 transmits the detected touch signal to the processor 310 to determine the type of a touch event. The processor 310 then provides a corresponding visual output on the display panel 361 according to the type of the touch event. Although in FIG. 3, the touch panel 371 and the display panel 361 are used as two independent components to implement the input and output functions of the terminal. However, in some embodiments, the touch panel 371 and the display panel 361 may be integrated to implement the input and output functions of the terminal, which is not limited herein.

The interface unit 38 is an interface by which an external device is connected to the terminal 30. For example, the external device may include a wired or wireless headset port, an external power (or battery charger) port, a wired or wireless data port, a memory card port, a port for connecting a device having an identification module, an audio input/output (I/O) port, a video I/O port, a headphone port, and the like. The interface unit 38 may be configured to receive input (for example, data information, and power) from an external device and transmit the received input to one or more components within the terminal 30 or may be configured to transfer data between the terminal 30 and the external device.

The memory 39 may be configured to store software programs as well as various data. The memory 39 may mainly include a program storage area and a data storage area. The program storage area may store an operating system (OS), an application required for at least one function (for example, a sound playing function, and an image playing function), and the like. The data storage area may store data (for example, audio data, and a phone book) created according to the use of a mobile phone. Moreover, the memory 39 may include a high-speed random access memory (RAM), and may further include a non-volatile storage, for example, at least one magnetic disk storage device, flash memory device, or other volatile solid-state storage device.

The processor 310 is the control center of the terminal and connects various portions of the entire terminal using various interfaces and lines, and performs various functions of the terminal and processes data by executing or running software programs and/or modules stored in the memory 39 and invoking data stored in the memory 39, so as to monitor the terminal as a whole. The processor 310 may include one or more processing units. Optionally, the processor 310 may integrate an application processor and a modem. The application processor mainly processes an OS, a user interface, an application, and the like. The modem mainly processes wireless communication. It may be understood that the modem may not be integrated into the processor 310.

The terminal 30 may further include a power supply 311 (for example, a battery) for powering various components. Optionally, the power supply 311 may be logically coupled to the processor 310 through a power management system, so as to implement charging management, discharging management, power consumption management, and other functions through the power management system.

In addition, the terminal 30 includes some functional modules not shown. Details thereof are not described herein.

Optionally, the present disclosure further provides in embodiments a terminal, including a processor 310, a memory 39, and a computer program stored in the memory 39 and executable on the processor 310. The computer program is configured to be executed by the processor 310 to implement various processes in the embodiments of the foregoing method for transmitting a PTRS, and can achieve the same technical effects. To avoid repetition, details are not described herein again. The terminal may be a wireless terminal or may be a wired terminal. The wireless terminal may be a device that provides a user with voice and/or other service data connectivity, a handheld device having a wireless connection function or another processing device connected to a wireless modem. The wireless terminal may communicate with one or more core networks through a radio access network (RAN). The wireless terminal may be a mobile terminal, for example, a mobile phone (or referred to as a "cellular" phone) or a computer equipped with a mobile terminal, for example, may be a portable, pocket-sized, handheld, computer built-in or in-vehicle mobile apparatus, which exchanges voice and/or data with the RAN. For example, the wireless terminal may be a device such as a personal communication service (PCS) phone, a cordless phone, a session initiation protocol (SIP) phone, a wireless local loop (WLL) station or a personal digital assistant (PDA). The wireless terminal may also be referred to as a system, a subscriber unit, a subscriber station, a mobile station, a mobile, a remote station, a remote terminal, an access terminal, a user terminal, a user agent, a user device (or user equipment), which is not limited herein.

The present disclosure further provides in embodiments a computer-readable storage medium, where the computer-readable storage medium stores therein a computer program, and the computer program is configured to be executed by a processor to implement various processes of the embodiments of the foregoing method for transmitting a PTRS, and can achieve the same technical effects. To avoid repetition, details are not described herein again. The computer-readable storage medium is, for example, a read-only memory (ROM), a RAM, a magnetic disk or an optical disc.

The method for transmitting a PTRS of the present disclosure is described in the foregoing embodiments from the perspective of a terminal side. The method for transmitting a PTRS on a network device side is further described in the following embodiment with reference to the accompanying drawings.

Figure 4:
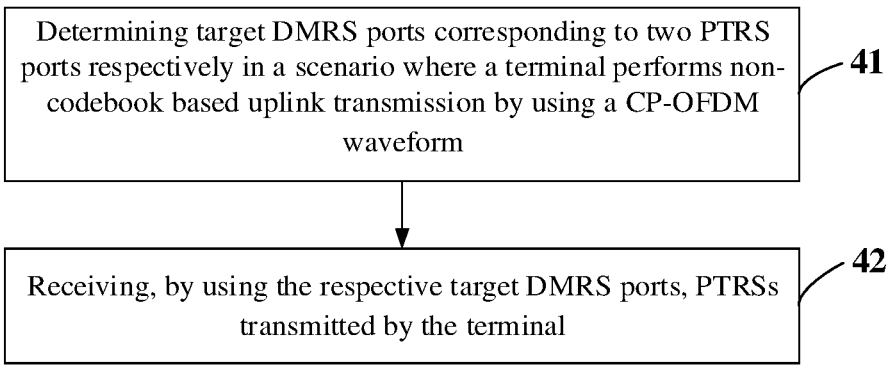
FIG. 4 is a schematic flowchart of a method for transmitting a PTRS applied to a network device side according to an embodiment of the present disclosure.

As shown in FIG. 4, the method for transmitting a PTRS according to an embodiment of the present disclosure is applied to a network device, and includes the following steps.

A step 41 includes: determining target DMRS ports corresponding to two PTRS ports respectively in a scenario where a terminal performs non-codebook based uplink transmission by using a CP-OFDM waveform.

When the terminal performs non-codebook based uplink transmission by using CP-OFDM, there are three types of uplink transmission, namely, fully-coherent transmission, semi-coherent transmission, and non-coherent transmission. For the fully-coherent transmission, only one uplink PTRS port is required. For the semi-coherent transmission and the non-coherent transmission, a plurality of uplink PTRS ports are required. When the configured quantity of PTRS ports is 2, before transmitting a corresponding PTRS, the terminal needs to determine a target DMRS port to which each PTRS port is mapped. If a plurality of SRS resources correspond to the same PTRS port number, DMRS ports corresponding to these SRS resources share the PTRS port. That is, one PTRS port may correspond to two or more DMRS ports. If at least one PTRS port of two PTRS ports corresponds to two or more DMRS ports, the corresponding PTRS port is preferentially mapped to a DMRS port with the optimal channel quality. In the embodiments of the present disclosure, an example in which the configured quantity of PTRS ports is 2 is described. A person skilled in the art may understand that when the configured quantity of PTRS ports is greater than 2, before transmitting a corresponding PTRS, the terminal needs to determine a target DMRS port to which each PTRS port is mapped. In other words, the embodiments of the present disclosure are applicable to a case in which the configured quantity of PTRS ports is greater than or equal to 2.

A step 42 includes: receiving, by using the respective target DMRS ports, PTRSs transmitted by the terminal.

After DMRS ports corresponding to two PTRS ports respectively are determined, PTRSs transmitted by a terminal are received by using respective target DMRS ports. Because a corresponding PTRS port is preferentially mapped to a DMRS port with the optimal channel quality, the phase noise estimation precision can be improved, thereby ensuring the reliability of uplink transmission.

The step 41 includes: if each PTRS port corresponds to one DMRS port, determining that DMRS ports corresponding to the two PTRS ports respectively are the respective target DMRS ports. That is, each of the two PTRSs only corresponds to one SRS resource (or SRI). That is, when there are only two DMRS ports, each PTRS port is mapped to a unique DMRS port that corresponds to the PTRS port. For example, the network device configures a PTRS port A for one SRS resource, and the SRS resource corresponds to a DMRS port with the smallest DMRS port attribute value. The network device configures a PTRS port B for another SRS resource, and the SRS resource corresponds to a DMRS port with the largest DMRS port attribute value. In this case, the PTRS port A corresponds to a DMRS port with the smallest DMRS port attribute value, and the PTRS port B corresponds to a DMRS port with the largest DMRS port attribute value. Or on the contrary, the network device configures a PTRS port A for one SRS resource, and the SRS resource corresponds to a DMRS port with the largest DMRS port attribute value. The network device configures a PTRS port B for another SRS resource, and the SRS resource corresponds to a DMRS port with the smallest DMRS port attribute value. In this case, the PTRS port A corresponds to a DMRS port with the largest DMRS port attribute value, and the PTRS port B corresponds to a DMRS port with the smallest DMRS port attribute value.

After the DMRS ports corresponding to the two PTRS ports respectively are determined, the network device may indicate a mapping between PTRS ports and DMRS ports to the terminal by using DCI. After the step 41, the method further includes: transmitting the DCI to the terminal, where the DCI includes an indication field, and the indication field is used for indicating DMRS ports corresponding to at least one PTRS port.

To reduce network overhead, the network device may only indicate, in the DCI, a mapping related to a PTRS port corresponding to a plurality of DMRS ports. Optionally, the indication field in the DCI is used for indicating a target DMRS port corresponding to a first PTRS port, the first PTRS port corresponding to at least two DMRS ports. Optionally, the network device indicates, by using a bit status of an indication bit of a DCI indication field, that a DMRS port with the smallest, the second smallest or the largest DMRS port attribute value is the target DMRS port corresponding to the first PTRS port. For example, the PTRS port corresponds to N DMRS ports, then a quantity of indication bits is M, where $2M-1<N\leq 2M$. When the value of the indication bit of the indication field in the DCI is $2m-1$, a DMRS port with the $2m^{th}$ largest or smallest DMRS port attribute value in the N DMRS ports is determined as the target DMRS port corresponding to the first PTRS port, wherein $1<m\leq M$.

Specifically, if the indication field includes one indication bit, the indication bit being a first value indicates that the target DMRS port is a DMRS port with the smallest DMRS port attribute value; the indication bit being a second value indicates that the target DMRS port is a DMRS port with the second smallest DMRS port attribute value; and the indication bit being null indicates that the target DMRS port is a DMRS port with the largest DMRS port attribute value. It should be noted that, the determinations according to different bit statuses that the DMRS port with the smallest, the second smallest, or the largest DMRS port attribute value is the target DMRS port are interchangeable. For example, when the indication bit is null (the indication bit is absent), it is determined that a DMRS port with the smallest or the second smallest DMRS port attribute value is the target DMRS port corresponding to the first PTRS port. When the indication bit is the first value or second value, it is determined that a DMRS port with the largest DMRS port attribute value is the target DMRS port corresponding to the first PTRS port.

Alternatively, if there is one first PTRS port and the indication field includes two indication bits, the two indication bits being a third value indicates that the target DMRS port is a DMRS port with the smallest DMRS port attribute value; the two indication bits being a fourth value indicates that the target DMRS port is a DMRS port with the second smallest DMRS port attribute value; and the two indication bits being a fifth value indicates that the target DMRS port is a DMRS port with the largest DMRS port attribute value.

When the indication field includes two indication bits, a most significant bit in the two indication bits indicates a first target DMRS port corresponding to one of the two PTRS ports, and a least significant bit in the two indication bits indicates a second target DMRS port corresponding to the other one of the two PTRS ports. In a preferred embodiment, the network device uses a bit status of the most significant bit in the two indication bits to indicate that a DMRS port with the smallest or the largest DMRS port attribute value is the first target DMRS port corresponding to one of the two PTRS ports; and the network device uses a bit status of the least significant bit in the two indication bits to indicate that a DMRS port with the smallest or the largest DMRS port attribute value is the second target DMRS port corresponding to the other one of the two PTRS ports. The bit status includes the bit value of 0 or 1.

Optionally, the most significant bit being a sixth value indicates that the first target DMRS port is a DMRS port with the smallest DMRS port attribute value; and the most significant bit in the two indication bits being a seventh value indicates that the first target DMRS port is a DMRS port with the largest DMRS port attribute value.

Optionally, the least significant bit in the two indication bits being an eighth value indicates that the second target DMRS port is a DMRS port with the smallest DMRS port attribute value; and the least significant bit in the two indication bits being a ninth value indicates that the second target DMRS port is a DMRS port with the largest DMRS port attribute value.

It should be noted that the DMRS port attribute value includes, but is not limited to, a DMRS port number or an SRI number corresponding to a DMRS port.

In the method for transmitting a PTRS in the embodiments of the present disclosure, a network device determines target DMRS ports corresponding to two PTRS ports respectively in a scenario where the terminal performs non-codebook based transmission by using a CP-OFDM waveform, so as to receive, by using the target DMRS ports, PTRSs transmitted by the terminal, so that a PTRS port can be mapped to a DMRS port with the optimal channel quality, and the phase noise estimation precision can be improved, thereby ensuring the reliability of uplink transmission.

The methods for transmitting a PTRS in different scenarios are separately described in detail in the foregoing embodiments. A network device corresponding to the method is further described in the following embodiment with reference to the accompanying drawings.

Figure 5:
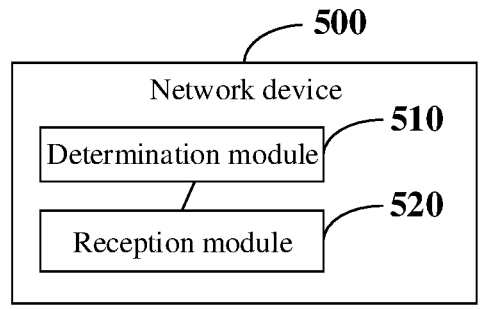
FIG. 5 is a schematic diagram of modular structure of a network device according to an embodiment of the present disclosure.

As shown in FIG. 5, a network device 500 according to an embodiment of the present disclosure can implement the details of the method of determining target DMRS ports corresponding to two PTRS ports respectively in a scenario where the terminal performs non-codebook based uplink transmission by using a CP-OFDM waveform and receiving, by using the respective target DMRS ports, PTRSs transmitted by the terminal in the foregoing embodiments, and achieve the same effects. The network device 500 specifically includes the following functional modules:

a determination module 510, configured to determine target DMRS ports corresponding to two PTRS ports respectively in a scenario where the terminal performs non-codebook based uplink transmission by using a CP-OFDM waveform; and a reception module 520, configured to receive, by using the respective target DMRS ports, PTRSs transmitted by the terminal.

The determination module 510 includes:

a third determination submodule, configured to, if each PTRS port corresponds to one DMRS port, determine that DMRS ports corresponding to the two PTRS ports respectively are the respective target DMRS ports.

The network device 500 further includes:

a second transmission module, configured to transmit DCI to the terminal, where the DCI includes an indication field, and the indication field is used for indicating DMRS ports corresponding to at least one PTRS port.

The indication field in the DCI is used for indicating a target DMRS port corresponding to a first PTRS port, the first PTRS port corresponding to at least two DMRS ports.

If the indication field includes one indication bit, the indication bit being a first value indicates that the target DMRS port is a DMRS port with the smallest DMRS port attribute value;

the indication bit being a second value indicates that the target DMRS port is a DMRS port with the second smallest DMRS port attribute value;

the indication bit being null indicates that the target DMRS port is a DMRS port with the largest DMRS port attribute value.

If there is one first PTRS port and the indication field includes two indication bits, the two indication bits being a third value indicates that the target DMRS port is a DMRS port with the smallest DMRS port attribute value;

the two indication bits being a fourth value indicates that the target DMRS port is a DMRS port with the second smallest DMRS port attribute value;

the two indication bits being a fifth value indicates that the target DMRS port is a DMRS port with the largest DMRS port attribute value.

When the indication field includes two indication bits, a most significant bit in the two indication bits indicates a first target DMRS port corresponding to one of the two PTRS ports, and a least significant bit in the two indication bits indicates a second target DMRS port corresponding to the other one of the two PTRS ports.

The most significant bit being a sixth value indicates that the first target DMRS port is a DMRS port with the smallest DMRS port attribute value;

the most significant bit in the two indication bits being a seventh value indicates that the first target DMRS port is a DMRS port with the largest DMRS port attribute value.

The least significant bit in the two indication bits being an eighth value indicates that the second target DMRS port is a DMRS port with the smallest DMRS port attribute value;

the least significant bit in the two indication bits being a ninth value indicates that the second target DMRS port is a DMRS port with the largest DMRS port attribute value.

The DMRS port attribute value includes a DMRS port number or an SRI number corresponding to a DMRS port.

It should be noted that the foregoing module division of the network device and the terminal is merely a logical function division. In actual implementation, all or some of the modules may be integrated into one physical entity, or may be physically separated. In addition, the modules may be implemented entirely in the form of software invoked by a processing element or implemented entirely in the form of hardware, or some modules may be implemented in the form of software invoked by a processing element and some modules may be implemented in the form of hardware. For example, the determination module may be a standalone processing element, or may be integrated into a chip of the apparatus. In addition, the determination module may be stored as program codes in a memory of the apparatus, and is invoked and executed by a processing element of the apparatus to perform the foregoing function of the determination module. Implementation of other module is similar to that of the determination module. In addition, all or some of the modules may be integrated together or may be implemented separately. The processing element described herein may be an integrated circuit with a signal processing capability. In an implementation process, steps of the foregoing method or the foregoing modules may be implemented by using an integrated logical circuit in a processor element in the form of hardware, or by using an instruction in the form of software.

For example, the foregoing modules may be one or more integrated circuits configured for implementing the foregoing method, for example, one or more application specific integrated circuits (ASICs), one or more digital signal processors (DSPs) or one or more field programmable gate arrays (FPGAs). For another example, when one of the foregoing modules is implemented in the form of a processing element invoking program codes, the processing element may be a general-purpose processor, for example, a central processing unit (CPU) or another processor that can invoke the program codes. For another example, the modules may be integrated and implemented in the form of a system-on-a-chip (SOC).

It should be noted that, in the embodiments of the present disclosure, a network device determines target DMRS ports corresponding to two PTRS ports respectively in a scenario where a terminal performs non-codebook based transmission by using a CP-OFDM waveform, so as to receive, by using the target DMRS ports, PTRSs transmitted by the terminal, so that a PTRS port can be mapped to a DMRS port with the optimal channel quality, and the phase noise estimation precision can be improved, thereby ensuring the reliability of uplink transmission.

To further achieve the foregoing object, the present disclosure further provides in embodiments a network device, including: a processor, a memory, and a computer program stored in the memory and configured to be executed by the processor, where the processor is configured to execute the computer program to implement the steps in the foregoing method for transmitting a PTRS. The present disclosure further provides in embodiments a computer-readable storage medium, the computer-readable storage medium storing therein a computer program, where the computer program is configured to be executed by a processor to implement the steps in the foregoing method for transmitting a PTRS.

Figure 6:
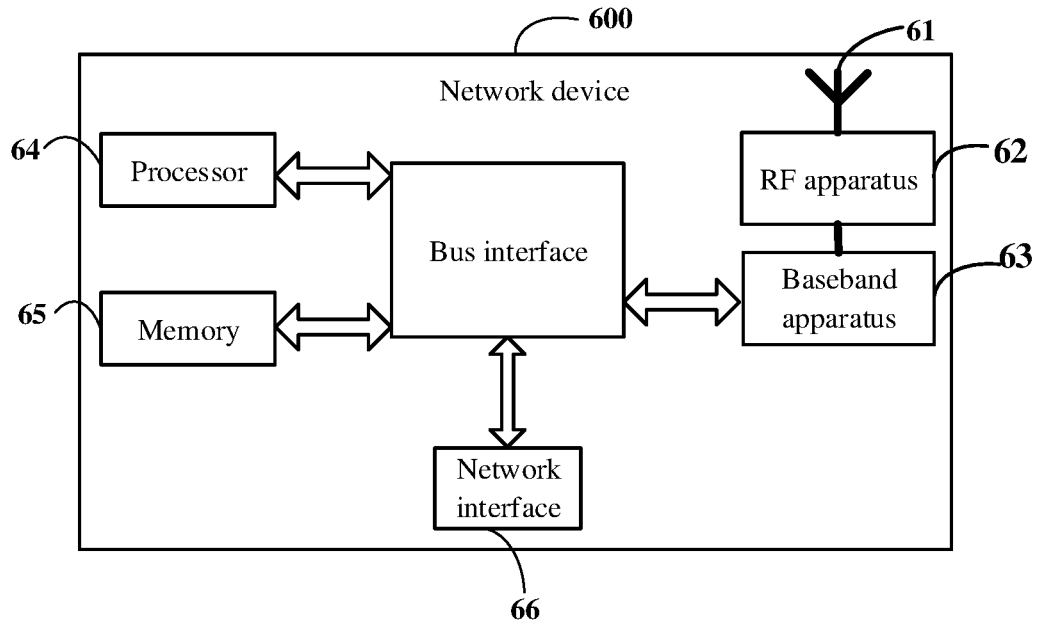
FIG. 6 is a block diagram of a network device according to an embodiment of the present disclosure.

Specifically, the present disclosure further provides in embodiments a network device. As shown in FIG. 6, a network device 600 includes an antenna 61, an RF apparatus 62, and a baseband apparatus 63. The antenna 61 is connected to the RF apparatus 62. In the uplink direction, the RF apparatus 62 receives information by using the antenna 61, and sends the received information to the baseband apparatus 63 for processing. In the downlink direction, the baseband apparatus 63 processes the information that needs to be transmitted, and sends the processed information to the RF apparatus 62. The RF apparatus 62 processes the received information and transmits the processed information via the antenna 61.

The band processing apparatus may be located in the baseband apparatus 63. The method performed by the network device in the foregoing embodiments may be implemented in the baseband apparatus 63. The baseband apparatus 63 includes a processor 64 and a memory 65.

The baseband apparatus 63 may, for example, include at least one baseband board. As shown in FIG. 6, the baseband board is provided with a plurality of chips, one of which is, for example, a processor 64 connected to the memory 65 and configured to invoke the program in the memory 65 to perform the operations of the network device in the foregoing method embodiments.

The baseband apparatus 63 may further include a network interface 66, configured to exchange information with the RF apparatus 62. The interface is, for example, a common public radio interface (CPRI).

The processor herein may be one processor or may refer to a plurality of processing elements collectively. For example, the processor may be a CPU or may be an ASIC or may be configured as one or more integrated circuits for implementing the foregoing method performed by the network device, for example, one or more DSPs or one or more FPGAs. The storage element may be one storage or may refer to a plurality of storage elements collectively.

The memory 65 may be a volatile memory or a non-volatile memory or may include both a volatile memory and a non-volatile memory. The non-volatile memory may be a ROM, a programmable ROM PROM), an erasable PROM (EPROM), an electrically EPROM (EEPROM) or a flash memory. The volatile memory may be a RAM used as an external cache. By way of example rather than limitation, many forms of RAMs such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM) may be used. The memory 65 described in the present application is intended to include, but is not limited to, these and any other appropriate types of memory.

Specifically, the network device in the embodiments of the present disclosure further includes a computer program stored in the memory 65 and configured to be executed by the processor 64. The processor 64 invokes the computer program in the memory 65 to implement the method performed by the modules as shown in FIG. 5.

Specifically, the computer program is configured to be invoked by the processor 64 to perform the following steps: determining target DMRS ports corresponding to two PTRS ports respectively in a scenario where a terminal performs non-codebook based uplink transmission by using a CP-OFDM waveform; and receiving, by using the respective target DMRS ports, PTRSs transmitted by the terminal.

Specifically, the computer program is configured to be invoked by the processor 64 to perform the following step: if each PTRS port corresponds to one DMRS port, determining that DMRS ports corresponding to the two PTRS ports respectively are the respective target DMRS ports.

Specifically, the computer program is configured to be invoked by the processor 64 to perform the following step: transmitting DCI to the terminal, where the DCI includes an indication field, and the indication field is used for indicating DMRS ports corresponding to at least one PTRS port.

The indication field in the DCI is used for indicating a target DMRS port corresponding to a first PTRS port, the first PTRS port corresponding to at least two DMRS ports.

If the indication field includes one indication bit, the indication bit being a first value indicates that the target DMRS port is a DMRS port with the smallest DMRS port attribute value;
   the indication bit being a second value indicates that the target DMRS port is a DMRS port with the second smallest DMRS port attribute value;
   the indication bit being null indicates that the target DMRS port is a DMRS port with the largest DMRS port attribute value.

If there is one first PTRS port and the indication field includes two indication bits, the two indication bits being a third value indicates that the target DMRS port is a DMRS port with the smallest DMRS port attribute value;
   the two indication bits being a fourth value indicates that the target DMRS port is a DMRS port with the second smallest DMRS port attribute value;
   the two indication bits being a fifth value indicates that the target DMRS port is a DMRS port with the largest DMRS port attribute value.

When the indication field includes two indication bits, a most significant bit in the two indication bits indicates a first target DMRS port corresponding to one of the two PTRS ports, and a least significant bit in the two indication bits indicates a second target DMRS port corresponding to the other one of the two PTRS ports.

The most significant bit being a sixth value indicates that the first target DMRS port is a DMRS port with the smallest DMRS port attribute value;
   the most significant bit in the two indication bits being a seventh value indicates that the first target DMRS port is a DMRS port with the largest DMRS port attribute value.

The least significant bit in the two indication bits being an eighth value indicates that the second target DMRS port is a DMRS port with the smallest DMRS port attribute value;
   the least significant bit in the two indication bits being a ninth value indicates that the second target DMRS port is a DMRS port with the largest DMRS port attribute value.

The DMRS port attribute value includes a DMRS port number or an SRI number corresponding to a DMRS port.

The network device may be a base transceiver station (BTS) in global system for mobile communications (GSM) or code division multiple access (CDMA), or may be a nodeB (NB) in wideband code division multiple access (WCDMA), or may be an evolved node B (eNB or eNodeB) in long term evolution (LTE), or a relay station or an access point, or a base station in a 5G network or the like, which is not limited herein.

The network device in the embodiments of the present disclosure determines target DMRS ports corresponding to two PTRS ports respectively in a scenario where the terminal performs non-codebook based transmission by using a CP-OFDM waveform, so as to receive, by using the target DMRS ports, PTRSs transmitted by the terminal, so that a PTRS port can be mapped to a DMRS port with the optimal channel quality, and the phase noise estimation precision can be improved, thereby ensuring the reliability of uplink transmission.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential parts, or parts contributing to the related art or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, an ROM, an RAM, a magnetic disk, or an optical disc.

In addition, it should be noted that in the apparatus and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A method for transmitting a phase tracking reference signal (PTRS), comprising:
   acquiring, by a terminal, target demodulation reference signal (DMRS) ports corresponding to two PTRS ports respectively in a scenario where the terminal performs non-codebook based uplink transmission by using a cyclic prefix-orthogonal frequency division multiplexing (CP-OFDM) waveform; and
   transmitting, by the terminal, corresponding PTRSs to a network device by using the respective target DMRS ports.

2. The method for transmitting the PTRS according to claim 1, wherein the acquiring, by the terminal, the target DMRS ports corresponding to the two PTRS ports respectively comprises:
   if each PTRS port corresponds to one DMRS port, determining, by the terminal, that DMRS ports corresponding to the two PTRS ports respectively are the respective target DMRS ports.

3. The method for transmitting the PTRS according to claim 1, wherein the acquiring, by the terminal, the target DMRS ports corresponding to the two PTRS ports respectively comprises:
   receiving, by the terminal, downlink control information (DCI) from the network device, wherein the DCI comprises an indication field, and the indication field is used for indicating a DMRS port corresponding to at least one PTRS port; and
   determining, by the terminal, the target DMRS ports corresponding to the two PTRS ports respectively according to the indication field in the DCI.

4. The method for transmitting the PTRS according to claim 3, wherein the determining, by the terminal, the target DMRS ports corresponding to the two PTRS ports respectively according to the indication field in the DCI comprises:
determining, by the terminal, if the two PTRS ports comprise a first PTRS port corresponding to at least two DMRS ports, a target DMRS port corresponding to the first PTRS port according to the indication field in the DCI.

5. The method for transmitting the PTRS according to claim 3, wherein when the indication field comprises two indication bits, the determining, by the terminal, the target DMRS ports corresponding to the two PTRS ports respectively according to the indication field in the DCI comprises:
determining, by the terminal, a first target DMRS port corresponding to one of the two PTRS ports according to a most significant bit in the two indication bits; and
determining, by the terminal, a second target DMRS port corresponding to the other one of the two PTRS ports according to a least significant bit in the two indication bits.

6. A terminal, comprising a processor, a memory, and a computer program stored in the memory and configured to be executed by the processor, wherein the processor is configured to execute the computer program to implement following steps:
acquiring target demodulation reference signal (DMRS) ports corresponding to two PTRS ports respectively in a scenario where the terminal performs non-codebook based uplink transmission by using a cyclic prefix-orthogonal frequency division multiplexing (CP-OFDM) waveform; and
transmitting corresponding PTRSs to a network device by using the respective target DMRS ports.

7. The terminal according to claim 6, wherein the processor is further configured to execute the computer program to implement following step:
if each PTRS port corresponds to one DMRS port, determining that DMRS ports corresponding to the two PTRS ports respectively are the respective target DMRS ports.

8. The terminal according to claim 6, wherein the processor is further configured to execute the computer program to implement following steps:
receiving downlink control information (DCI) from the network device, wherein the DCI comprises an indication field, and the indication field is used for indicating a DMRS port corresponding to at least one PTRS port; and
determining the target DMRS ports corresponding to the two PTRS ports respectively according to the indication field in the DCI.

9. The terminal according to claim 8, wherein the processor is further configured to execute the computer program to implement following step:
determining, if the two PTRS ports comprise a first PTRS port corresponding to at least two DMRS ports, a target DMRS port corresponding to the first PTRS port according to the indication field in the DCI.

10. The terminal according to claim 8, wherein the processor is further configured to execute the computer program to implement following steps:
determining a first target DMRS port corresponding to one of the two PTRS ports according to a most significant bit in the two indication bits; and
determining a second target DMRS port corresponding to the other one of the two PTRS ports according to a least significant bit in the two indication bits.

11. A method for transmitting a phase tracking reference signal (PTRS), comprising:
determining, by a network device, target demodulation reference signal (DMRS) ports corresponding to two PTRS ports respectively in a scenario where non-codebook based uplink transmission is performed by a terminal through a cyclic prefix-orthogonal frequency-division multiplexing (CP-OFDM) waveform; and
receiving, by the network device by using the respective target DMRS ports, PTRSs transmitted by the terminal.

12. The method for transmitting the PTRS according to claim 11, wherein the determining, by the network device, the target DMRS ports corresponding to the two PTRS ports respectively comprises:
if each PTRS port corresponds to one DMRS port, determining, by the network device, that DMRS ports corresponding to the two PTRS ports respectively are the respective target DMRS ports.

13. The method for transmitting the PTRS according to claim 11, wherein, after the determining, by the network device, the target DMRS ports corresponding to the two PTRS ports respectively, the method further comprises:
transmitting, by the network device, downlink control information (DCI) to the terminal, wherein the DCI comprises an indication field, and the indication field is used for indicating a DMRS port corresponding to at least one PTRS port.

14. The method for transmitting the PTRS according to claim 13, wherein the indication field in the DCI is used for indicating a target DMRS port corresponding to a first PTRS port, the first PTRS port corresponding to at least two DMRS ports.

15. The method for transmitting the PTRS according to claim 13, wherein when the indication field comprises two indication bits, a most significant bit in the two indication bits indicates a first target DMRS port corresponding to one of the two PTRS ports, and a least significant bit in the two indication bits indicates a second target DMRS port corresponding to the other one of the two PTRS ports.

16. A network device, comprising a processor, a memory, and a computer program stored in the memory and configured to be executed by the processor, wherein the processor is configured to execute the computer program to implement steps in the method for transmitting a phase tracking reference signal (PTRS) according to claim 11.

17. The network device according to claim 16, wherein the processor is further configured to execute the computer program to implement following step:
if each PTRS port corresponds to one DMRS port, determining that DMRS ports corresponding to the two PTRS ports respectively are the respective target DMRS ports.

18. The network device according to claim 16, wherein the processor is further configured to execute the computer program to implement following step:
transmitting downlink control information (DCI) to the terminal, wherein the DCI comprises an indication field, and the indication field is used for indicating a DMRS port corresponding to at least one PTRS port.

19. The network device according to claim 18, wherein the indication field in the DCI is used for indicating a target DMRS port corresponding to a first PTRS port, the first PTRS port corresponding to at least two DMRS ports.

20. The network device according to claim 18, wherein, when the indication field comprises two indication bits, a most significant bit in the two indication bits indicates a first target DMRS port corresponding to one of the two PTRS ports, and a least significant bit in the two indication bits indicates a second target DMRS port corresponding to the other one of the two PTRS ports.

\* \* \* \* \*